Patented Mar. 13, 1951

2,545,304

UNITED STATES PATENT OFFICE 2,545,304

VITAMIN PRODUCTS AND METHODS OF OBTAINING THE SAME

Joseph J. Pfiffner, Detroit, Mich., assignor to Parke, Davis & Company, Detroit, Mich., a corporation of Michigan No Drawing. Application June 16, 1945, Serial No. 599,955

10 Claims. (Cl. 260—251.5)

This application is a continuation-in-part of my copending application Serial No. 504,930, filed October 4, 1943 (now abandoned), and the invention relates to products having an activity of the so-called chick anti-anemia vitamin and to the methods of obtaining the same.

Considerable difficulty has been encountered when attempting to isolate or concentrate a chick anti-anemia activity from plant or animal sources, because the impurities tend to go through the purification steps along with the vitamin.

One of the objects of the present invention is to provide an entirely new pure chemical compound possessing the chick anti-anemia vitamin activity.

Another object of this present invention is to provide a pure chemical compound obtainable from plant sources possessing the chick anti-anemia vitamin activity which is suitable for administration to humans or animals and which has little or no growth promoting activity for *Lactobacillus casei* but which may be readily converted to the pure chick anti-anemia vitamin having said activity.

It is also an object of the invention to provide steps whereby a pure chemical compound possessing the above properties can be readily isolated from plant or animal sources by economical and novel procedures which lead to a commercially and therapeutically useful compound.

By "plant sources" I mean vegetable tissues, such as alfalfa and like plants, or fungi, such as for example yeast, molds and the like. By "animal tissues" I mean mammalian tissues containing the chick anti-anemia activity such as kidney, liver, spleen, stomach and like tissues.

It has now been found that the anti-anemia vitamin activity is present in most, if not all, plant and fresh animal tissue sources in a chemical form different from that which it has in autolyzed animal tissues such as liver, spleen, kidney, stomach and the like. This can be proved by comparing the pure chick anti-anemia active products isolated from autolyzed animal tissues with those isolated from plant tissues or fresh animal tissues, as to their property of stimulating growth of bacteria. I have found that the pure chemical compound possessing chick anti-anemia activity isolated from plant sources, e. g. yeast, or fresh animal tissue, such as fresh kidney or liver tissue, is essentially inert, so far as its property of stimulating bacterial growth is concerned, although it possesses anti-anemia potency in chicks, while the compound isolated from autolyzed animal tissues possesses both the property of stimulating bacterial growth and the property of exercising an anti-anemia effect in chicks.

I have found that plant tissues or fresh animal tissues, their aqueous extracts or concentrates, as well as the pure anti-anemia effective chemical compound obtainable from such plant and animal sources can be subjected to a certain enzymatic digestion, thereby imparting to them the property of stimulating bacterial growth, without destruction of the anti-anemia property.

I have for the first time isolated the microbiologically inactive chemical compound present in plant and fresh animal tissues which is responsible for the chick anti-anemia potency of said tissues. I have also found that the compound is a relatively simple non-protein, non-carbohydrate conjugate of the above mentioned microbiologically active compound obtainable from autolyzed animal tissue. I find that good yields of the chick anti-anemia vitamin, as obtained from autolyzed animal tissue, are obtainable from plants, fungi and fresh animal tissue by first isolating the pure conjugated material and then breaking down the conjugated material by enzymatic treatment. The active compound obtained as a result of the enzyme treatment step is the unconjugated material. This same unconjugated material may also be obtained by carrying out the enzymatic treatment on the crude or concentrated conjugate, followed by concentration and isolation of the unconjugated material. However, for purposes of purity and ease of isolation it is preferable to first obtain the pure conjugate before utilizing the enzymatic treatment.

I have also found that the new vitamin conjugate exhibits physiological properties which are not shown by any of the known vitamins. Although this new vitamin conjugate is effective in preventing certain types of anemia, in humans and animals, and is obtainable from mammalian liver, it can be shown to be very different from the active principles heretofore separated from liver. One of the outstanding differences between this new vitamin conjugate and the liver products of the prior art is that the vitamin conjugate is not effective against pernicious anemia whereas the liver products of the prior art are very effective in treatment of this type of anemia.

I have found that the pure chick anti-anemia vitamin conjugate, pteroyl hepta glutamic acid, like the unconjugated vitamin pteroyl glutamic acid, is amphoteric in nature. It forms salts of the metallic elements such as the sodium, potassium, calcium, barium, zinc, silver and lead salts. The vitamin conjugate also forms acid addition salts with strong mineral acids such as hydrochloric acid, hydrobromic acid, sulfuric acid and the like acids.

The pure vitamin conjugate can be esterified with alcohols such as methyl, ethyl, n-propyl, iso-propyl, n-butyl and the like alcohols to yield well defined crystalline esters. These esters are pteroyl hepta glutamides having the formula,

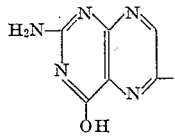

where R is alkyl. I have also found that relatively crude concentrates containing the conjugated anti-anemia vitamin may be esterified with alcohols and the pure vitamin conjugate esters isolated from the resulting mixture. These latter esters are identical with the esters prepared by direct esterification of the pure vitamin conjugate itself. Furthermore, the esters of the vitamin conjugate may be hydrolyzed by known methods to the unconjugated vitamin. The esters of the vitamin conjugate form well defined acid addition salts with the strong mineral acids such as hydrochloric acid, hydrobromic acid, sulfuric acid and the like acids.

I have also found that the pure chick antianemia vitamin conjugate does not contain a protein or carbohydrate like residue and that its molecular weight is approximately three times that of unconjugated anti-anemia vitamin. The ultraviolet absorption spectrum of the pure vitamin conjugate is very similar to that shown by the unconjugated vitamin itself, differing only in the heights of the maxima and minima ($E_{1\ cm.}^{1\%}$ values)

which would be expected from the increased molecular weight. This indicates that the characteristic ultraviolet absorption spectrum is dependent primarily upon the structure of the portion of the molecule responsible for the chick anti-anemia activity.

It has also been found that the esters of the vitamin conjugate differ from the free vitamin conjugate in that they are not convertible to the unconjugated vitamin by enzymatic treatment. However, if the esters are first hydrolyzed to remove the ester radical and the resultant product subjected to enzymatic digestion, the unconjugated anti-anemia vitamin is obtained.

The invention is illustrated by the following examples.

*Example 1*

30 lbs. of brewer's yeast extract Type III is used. This extract in dry form is a product which can be obtained on the market and is prepared by making an aqueous extract of yeast cells (*Saccharomyces cerevisiae*), filtering the extract and evaporating it to dryness. The 30 lbs. of dry extract material is dissolved in about 23 gallons of water, the solution heated to the boiling point and then filtered through Super-Cel, a diatomaceous earth product. Sulfuric acid is carefully added to the filtered solution until the pH is about 3.

4.2 lbs. of active carbon, such as the product known as "Norite SG–11," is added to the acidic solution, the mixture stirred for an hour, and then filtered. The filtrate is discarded. The charcoal is washed with water and then with 50% alcohol and the washings, containing various impurities, discarded.

The activity is removed from the washed charcoal by eluting it a few times with 3 gallons of about 5% ammonia dissolved in 50% aqueous ethanol. The eluates are combined and concentrated to 0.65 gallon. The eluates contain 0.65 kilogram of solids and about 75 to 80% of the original activity.

The combined and concentrated eluates are exhaustively extracted with butyl alcohol at approximately neutral pH, thereafter acidified to about pH 3 and again exhaustively extracted with butyl alcohol. The butyl alcohol extracts contain impurities and are discarded in each case. The extracted aqueous residue containing the conjugate vitamin is freed from butyl alcohol by distillation, and then evaporated to dryness under vacuum at low temperature. About 0.65 lb. of a dry product containing the conjugated vitamin product is thereby obtained.

The dry material is dissolved in 6 liters of water and poured slowly with starring into a mixture of 12.75 liters of acetone and 0.6 liter of 1 N hydrochloric acid. The precipitate which separates is collected and again extracted in the same manner and discarded. The combined aqueous acetone extracts are designated as solution A. Solution A is treated with about 100 g. of activated carbon, such as the product known as "Norite SG–11," stirred for about an hour and filtered. The filtrate is discarded. The activity is eluted from the charcoal by successively washing with a total of 4 liters of a solution of 5% ammonia dissolved in 50% aqueous ethanol. The solid is discarded and the combined eluates evaporated to a volume of about 1 liter.

Alternatively, solution A may be treated with one equivalent of 1 N sodium hydroxide solution and the phases allowed to separate. The acetone phase which contains impurities is discarded and the aqueous phase which contains the vitamin conjugate evaporated to a volume of about 1 liter.

The concentrated solution obtained by either of the above alternate procedures is shaken with an equal volume of phenol, the layers partitioned and the phenol phase which contains impurities discarded. The aqueous phase which contains the vitamin conjugate is saturated with ammonium sulfate and again extracted with an equal volume of phenol. The layers are separated and the aqueous layer discarded.

The phenol layer containing the activity is shaken with 500 ml. of water and 3 liters of ether, the layers separated and the ether-phenol layer discarded. The aqueous solution is adjusted to pH 7 by the addition of 10% sodium hydroxide solution and 30 g. of zinc acetate added. A precipitate of the zinc salt of the vitamin conjugate separates which is removed. The zinc salt is suspended in 100 ml. of water and the pH of the mixture adjusted to about 2.5 by the addition of 10% hydrochloric acid. The material which fails to dissolve is discarded and the aqueous solution containing the vitamin conjugate extracted with an equal volume of phenol. The aqueous layer which contains impurities is discarded. The phenol layer is shaken with 500 ml.

of water and 3 liters of ether, the layers separated and the phenol-ether layer discarded. The aqueous solution containing the vitamin conjugate is adjusted to pH 7 with 10% sodium hydroxide solution. The small precipitate which separates is removed, discarded and the aqueous filtrate evaporated to a volume of about 30 ml. on the steam cone at atmospheric pressure or, if preferred, under reduced pressure.

The aqueous solution is treated with 15 g. of zinc acetate and the zinc salt of the vitamin conjugate which separates removed and dried. The aqueous solution is discarded. The dry zinc salt is stirred with 50 ml. of 1% hydrochloric acid in methanol overnight. The reaction mixture is concentrated to a volume of about 5 ml., taken up in 40 ml. of water, the pH of the mixture is adjusted to about 3 and the mixture placed in the refrigerator overnight. The first crop of the yellow crystalline methyl ester, 50 mg., is removed by filtration and the filtrate allowed to stand whereby a second crop of about 20 mg. of the methyl ester is obtained.

The crude methyl ester is purified by washing with water followed by recrystallization from 50% methanol, then from 95% ethanol and finally by recrystallization from water. After washing the purified ester with alcohol and then with ether it is dried in the air. The pure ester is obtained as yellow, microcrystalline, birefringent spherules which melt at 212–15° C. with decomposition.

The pure methyl ester contains the elements carbon, hydrogen, nitrogen and oxygen. It is octamethyl pteroyl hepta glutamide having the formula,

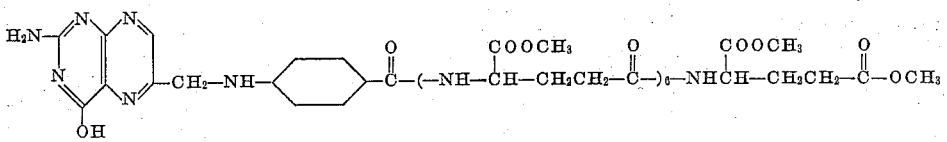

Sample analysis of the pure crystalline ester are,

| | | |
|---|---|---|
| Carbon | per cent | 50.9 50.9 |
| Hydrogen | do | 6.0 6.1 |
| Nitrogen (Dumas) | do | 14.2 |
| Oxygen | do | 38.9 |

The methyl ester of the vitamin conjugate exhibits basic properties and forms acid addition salts with strong mineral acids. For example, the hydrochloride salt is prepared in the following manner. 20 mg. of the pure methyl ester of the vitamin conjugate is taken up in a small amount of anhydrous methanol and an excess of 10% hydrochloric acid added to the solution. Acetone is added which causes the hydrochloride salt to separate. The salt is collected, washed with acetone and dried whereby a white microcrystalline powder is obtained.

*Example 2*

50 mg. of the purified methyl ester of the vitamin conjugate (prepared as described in Example 1) is suspended in 20 ml. of 0.05 N sodium hydroxide and the mixture allowed to stand overnight. The mixture is concentrated by evaporation in vacuo, the pH of the concentrate adjusted to about 3 by the addition of 10% hydrochloric acid and the mixture chilled. The free vitamin conjugate which separates as a yellow powder is removed by filtration and washed with small volumes of ice water. The crude product is purified by recrystallization from hot water to which enough hydrochloric acid has been added to make the pH about 3, washed with alcohol and ether and dried.

The pure vitamin conjugate is obtained as yellow, microcrystalline, birefringent spherules having no melting point but discoloring about 200° C., partially melting at 230–260° C. but not melting completely up to 360° C.

The pure vitamin conjugate contains the elements carbon, hydrogen, oxygen, and nitrogen. It is pteroyl hepta glutamic acid having the formula,

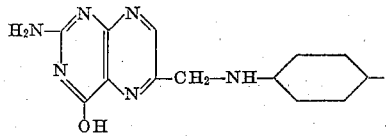
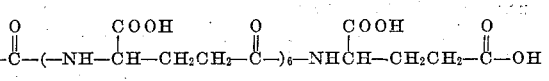

A sample analysis of the pure crystalline vitamin conjugate is,

| | Per cent |
|---|---|
| Carbon | 49.6 |
| Hydrogen | 5.4 |
| Nitrogen | 14.8 |
| Oxygen | 40.2 |

The pure conjugate has a characteristic ultraviolet absorption spectrum. The spectrum at pH 11 exhibits three absorption maxima at wave lengths 365 mμ, 282.5 mμ and 365 mμ, with $$E_{1\,cm.}^{1\%}$$

of approximately 77.5, 210 and 214 respectively. At pH 3.02 it shows a maximum at wave length 282.5 with $$E_{1\,cm.}^{1\%}$$

of 204 while at pH 1 the maximum is at wave length 297.5 where $$E_{1\,cm.}^{1\%}$$

has a value of 169. The spectrum at pH 11 shows three absorption minima at wave lengths 235 mμ, 267 mμ and 332 mμ with $$E_{1\,cm.}^{1\%}$$

of approximately 133, 186 and 55 respectively. At pH 3.04 one minimum at wave length 253 mμ, 267 mμ and 332 mμ with $$E_{1\,cm.}^{1\%}$$

of 98 is shown. At pH 1.04 one minimum is shown at wave length 263 mμ with an $$E_{1\,cm.}^{1\%}$$

of 97. This ultraviolet absorption spectrum is essentially the same as that shown by the free vitamin as described in the co-pending application of Joseph J. Pfiffner et al., Serial No. 477,998, filed March 4, 1943, now Patent No. 2,407,096, issued September 3, 1946, but the maxima are about one-third as high, which indicates that the ultraviolet absorption spectrum depends primarily on the structure of the free vitamin itself chemically combined in the vitamin conjugate and that the vitamin portion is about one-third of the vitamin conjugate molecule.

The vitamin active part contained in the vitamin conjugate may also be determined by splitting the vitamin conjugate by enzymatic treatment and isolating the free vitamin as described in Example 4 below. That the vitamin contained in the vitamin conjugate is about one-third of the entire vitamin conjugate molecule is also shown by the calculations based on the assay of the anti-anemia properties of the vitamin conjugate in chicks.

The pure conjugate is non-protein in nature and gives a negative biuret test. The conjugate also gives a negative Molisch test for carbohydrates or sugars. Additional evidence of the non-protein nature of the vitamin conjugate is that it is dialyzable through cellophane No. 300, is not precipitated by heat in acid solution, by saturated ammonium sulfate at pH levels between 3 and 7, nor by trichloroacetic acid.

The pure vitamin conjugate has very little or no growth effect on either *Lactobacillus casei* or *Streptococcus lactus*.

The vitamin conjugate is amphoteric, forming salts with alkaline reagents, esters with alcohols and salts with mineral acids.

Some examples of the salts which may be prepared from the vitamin conjugate and alkaline reagents such as alkali or alkaline earth hydroxides, carbonates and the like are the barium (described below in Example 3), sodium, potassium, lithium, and calcium salts. The sodium salt is prepared, for example, in the following manner. 25 mg. of the pure vitamin conjugate is dissolved in distilled water and to the resulting solution a slight excess of 1 N sodium hydroxide is added. The solution is concentrated by evaporation in vacuo to a volume of about 3 ml. and the sodium salt precipitated by adding acetone. The salt is removed by filtration, washed well with acetone and dried. This salt may also be prepared by adding exactly an equivalent amount of 1 N sodium hydroxide solution to a solution of the pure vitamin conjugate in water, freezing the solution of the pure vitamin conjugate and subliming the ice therefrom under reduced pressures and at low temperatures. The sodium salts obtained by the two methods are identical.

Vitamin conjugate salts of metals which are water insoluble may be prepared by displacement of acetic acid from its salts. Some examples of these salts are, the zinc, lead, silver, ferric and like salts. These salts may be prepared as shown in Example 1 by treatment of an aqueous solution of the vitamin conjugate with the corresponding acetate salt of the metal. These salts may also be prepared by treatment of aqueous solutions of the vitamin conjugate with other soluble metal salts such as silver nitrate, zinc nitrate, zinc chloride, ferric chloride and the like.

The esters of the vitamin conjugate are prepared by treatment of the conjugate with an excess of the alcohol and a small amount of a mineral acid such as hydrochloric or sulfuric acids. After standing overnight the mixture is concentrated, diluted with water and the pH of the mixture adjusted to about 3. On cooling and standing the crystalline ester separates. The ester is removed by filtration, washed with water and recrystallized from 50% methanol. Some examples of the esters which may be prepared in this manner are; the methyl, ethyl, propyl, n-butyl, iso-butyl, n-amyl and n-hexyl esters. The methyl ester prepared by this procedure from the pure vitamin conjugate is identical with the methyl ester obtained in Example 1.

The acid addition salts of the vitamin conjugate are prepared by adding an excess of mineral acid to an aqueous solution of the vitamin conjugate and precipitating the acid addition salt by adding acetone or alcohol. For example, the hydrochloride salt is prepared by dissolving 25 mg. of the pure vitamin conjugate in a small amount of water or methanol and adding an excess of 10% hydrochloric acid. Acetone is added and the white hydrochloride salt which precipitates removed by filtration, washed with acetone and dried. In a similar manner the hydrobromide, sulfate, phosphate, nitrate and like salts may be prepared.

*Example 3*

30 lbs. of brewer's yeast extract Type III is used. This extract in dry form is a product which can be obtained on the market and is prepared by making an aqueous extract of yeast cells (*Saccharomyces cerevisiae*), filtering the extract and evaporating it to dryness. The 30 lbs. of dry extract material is dissolved in about 23 gallons of water, the solution heated to the boiling point and then filtered through Super-Cel, a diatomaceous earth product. Sulfuric acid is carefully added to the filtered solution until the pH is about 3.

4.2 lbs. of active carbon, such as the product known as "Norite SG-11" is added to the acidic solution, the mixture stirred for an hour, and then filtered. The filtrate is discarded. The charcoal is washed with water and then with 50% alcohol and the washings, containing various impurities, discarded.

The activity is removed from the washed charcoal by eluting it a few times with 3 gallons of about 5% ammonia dissolved in 50% aqueous ethanol. The eluates are combined and concentrated to 0.65 gallon. The eluates contain 0.65 kilogram of solids and about 75 to 80% of the original activity.

The combined and concentrated eluates are exhaustively extracted with amyl alcohol at approximately neutral pH, thereafter acidified to about pH 3 and again exhaustively extracted with amyl alcohol. The amyl alcohol extracts contain impurities and are discarded in each case. The extracted aqueous residue containing the conjugate vitamin is freed from amyl alcohol by distillation, and then evaporated to dryness under vacuum at low temperature. About 0.65 lb. of a dry product containing the conjugated vitamin product is thereby obtained.

The dry material is dissolved in 6 liters of water and poured slowly with stirring into a mixture of 12.75 liters of acetone and 0.6 liter of 1 N hydrochloric acid. The precipitate which separates is collected and again extracted in the same manner and discarded. The combined aqueous acetone extracts are designated as solution A. Solution A is treated with about 100 g. of activated carbon, such as the product known as "Norite SG-11," stirred for about an hour and filtered. The filtrate is discarded. The activity is eluted from the charcoal by successively washing with a total of 4 liters of a solution of 5% ammonia dissolved in 50% aqueous ethanol. The solid is discarded and the combined eluates evaporated to a volume of about 1 liter.

Alternatively, solution A may be treated with one equivalent of 1 N sodium hydroxide solution and the phases allowed to separate. The acetone phase which contains impurities is discarded and the aqueous phase which contains the vitamin conjugate evaporated to a volume of about 1 liter.

The concentrated solution obtained by either of the above alternate procedures is shaken with an equal volume of phenol, the layers partitioned and the phenol phase which contains impurities discarded. The aqueous phase which contains the vitamin conjugate is saturated with ammonium sulfate and again extracted with an equal volume of phenol. The layers are separated and the aqueous layer discarded.

The phenol layer containing the activity is shaken with 500 ml. of water and 3 liters of ether, the layers separated and the ether-phenol layer discarded. The aqueous solution is adjusted to pH 7 by the addition of 10% sodium hydroxide solution and 30 g. of zinc acetate added. A precipitate of the zinc salt of the vitamin conjugate separates which is removed. The zinc salt is suspended in 100 ml. of water and the pH of the mixture adjusted to about 2.5 by the addition of 10% hydrochloric acid. The material which fails to dissolve is discarded and the aqueous solution containing the vitamin conjugate extracted with an equal volume of phenol. The aqueous layer which contains impurities is discarded. The phenol layer is shaken with 500 ml. of water and 3 liters of ether, the layers separated and the phenol-ether layer discarded. The aqueous solution containing the vitamin conjugate is adjusted to pH 7 with 10% sodium hydroxide solution. The small precipitate which separates is removed, discarded and the aqueous filtrate evaporated to a volume of about 30 ml. on the steam cone at atmospheric pressure or, if preferred, under reduced pressure.

1.5 g. of barium hydroxide octahydrate is added to the aqueous solution with stirring and the copious precipitate which separates removed by filtration and discarded. The aqueous filtrate is added with stirring to 10 volumes of methanol which causes the barium salt of the vitamin conjugate to separate. The barium salt is collected, dissolved in 75 ml. of distilled water, the pH of the solution adjusted to about 5 with 10% hydrochloric acid and the solution chilled in the refrigerator. The precipitate which separates is removed and discarded.

The aqueous acidified filtrate is evaporated to a volume of about 40 ml., chilled thoroughly and the small precipitate which forms removed by centrifuging and discarded. The aqueous solution is adjusted to about pH 2.8 with dilute hydrochloric acid and placed in the refrigerator overnight. The yellow vitamin conjugate which separates as microcrystalline, birefringent spherules is removed by filtration, washed with small volumes of cold water and dried; yield 15 mg. If desired, the product may be purified further by recrystallization from hot water acidified to pH 3 with hydrochloric acid.

An additional 15 mg. of the crystalline vitamin conjugate may be obtained by reworking the precipitate resulting from solution of the barium salt of the vitamin conjugate and the subsequent precipitates containing impurities.

The pure vitamin conjugate, pteroyl hepta glutamic acid, obtained by this procedure is identical in all its chemical, physical and physiological properties to the vitamin conjugate prepared as described in Example 2.

I have found that numerous variations may be made in my new processes, shown in the above examples, for the isolation of the anti-anemia vitamin conjugate. For example, I may omit the extraction of the crude extracts, obtained by elution of the activity from charcoal with ammonia in alcohol, with an alcohol such as butyl or amyl alcohol. If this step is omitted I find that it is advantageous to purify the vitamin conjugate through the methyl ester, as shown in Example 1, and to reprecipitate the conjugate several times as the zinc salt.

Another variation which I have found may be made in the above processes is the omission of the extractions with phenol. In this process it is advisable to purify the vitamin conjugate through the methyl ester, as shown in Example 1, hydrolyze the methyl ester to the vitamin conjugate according to the process described in Example 2, and then reprecipitate the free acidic vitamin conjugate as the zinc salt several times. The zinc salt is decomposed and the crude vitamin conjugate re-esterified with methyl alcohol and the methyl ester recrystallized until pure. The methyl ester is then again hydrolyzed as shown in Example 2 to the free vitamin conjugate.

Still another variation which I may make in my new isolation processes described above is the treatment of the original crude aqueous yeast extract with acidified acetone to obtain an extract similar to that of solution A in Examples 1 and 3. The isolation of the free vitamin conjugate may then be accomplished as shown for the purification of solution A in Example 3 or in the combination of Examples 1 and 2.

I have found that the combined process described in Examples 1 and 2 gives high yields of the new vitamin conjugate. This particular process also yields a product which is more readily purified and obtained in crystalline form while the process described in Example 3 gives a product which is also readily purified and obtained in crystalline form but the yield is slightly lower.

In the above examples I have shown the isolation of the new vitamin conjugate from yeast for the purpose of comparing the yields of the product as isolated from the same source by different processes. However, it should be understood that I may also isolate the vitamin conjugate from other plant and animal tissues by application of the processes which I have described above. For example, when using fresh beef kidney as a source of the new vitamin conjugate I proceed as follows: 50 lbs. of ground fresh beef kidney is extracted with about 40 gallons of water and the extracts heated to boiling for 15 minutes. I find that boiling the extracts is necessary to insure destruction of the enzyme present in the tissue which on prolonged digestion at normal temperatures or on autolysis of the tissue splits the vitamin conjugate to yield the acid product described and claimed in Patent No. 2,407,096 above referred to. The aqueous extracts are filtered, cooled and treated by any of the various processes described above.

The new vitamin products of the present invention are assayed on chicks to determine the anti-anemia vitamin potency. This can be done by feeding day old white Leghorn chicks a ration which will produce anemia (evidenced by a hematocrit value of 20% or less) and then determine the least amount of the vitamin product that will either cure or prevent anemia. Under these conditions a curative unit is defined as the least amount of the test substance, given in 6 doses on alternate days, that will raise the hematocrit value from 20% (or less) up to an average of 30% (or more), by volume, in at least 60% of the chicks. Similarly, a prophylactic unit is defined as the least amount of the test substance, incorporated in the diet, that will maintain over a 4-week assay, a gain in weight and a hematocrit value approximately comparable with that of the normal control chicks.

The following anemia producing diet can be used for these tests:

|  | Grams |
|---|---|
| Casein purified | 25.00 |
| Casein purified + biotin conc | 5.00 |
| Cornstarch | 36.00 |
| Lard | 16.85 |
| Salts (O and U) | 3.90 |
| $MnSO_4.4H_2O$ | 0.1 |
| Celluflour | 3.0 |
| Gelatin | 10.0 |
| Vitamin mixture (ADEK)[2] | 0.15 |
| Vitamin mixture (B complex)[3] | 0.10 |
| Choline hydrochloride | 0.20 |
| Pantothenic acid | 0.01 |

Vitamins per 100 grams of ration:

1. 20 micrograms of biotin
2. 320 International Units of vitamin A
   32 International Units of vitamin D
   10 milligrams of 2-methyl-1,4-naphthoquinone
   4 milligrams of α-tocopherol
3. Thiamine, 0.4 milligram
   Riboflavin, 0.4 milligram
   Pyridoxin, 0.6 milligram
   Inositol, 50.0 milligrams
   Para-aminobenzoic acid, 15.0 milligrams
   Nicotinic acid, 0.5 milligram The pure crystalline chick anti-anemia vitamin conjugate, prepared as described in Examples 2 and 3, when assayed according to the above procedure in chicks fed on the anemia producing diet described has one curative unit per 60 gamma and one prophylactic unit per 0.45 gamma. The crystalline methyl ester of the pure vitamin conjugate, prepared as described in Example 1, likewise has about one curative unit per 60 gamma and about one prophylactic unit per 0.45 gamma. The pure chick anti-anemia vitamin, prepared as described in Example 4 and described and claimed in Patent No. 2,407,096 above referred to, when assayed by this method in chicks fed on the above anemia producing diet has one curative unit per 20 gamma and one prophylactic unit per 0.15 gamma.

*Example 4*

200 mg. of the pure vitamin conjugate, pteroyl hepta glutamic acid, prepared as described in Example 2 or 3 above is taken up in a small amount of water and 200 ml. of an aqueous extract of fresh kidney added and the mixture digested for a day or two at 37° C. The kidney extract is prepared by grinding 100 g. of fresh kidney tissue with three volumes of water and filtering to remove the insoluble matter. Assays show that only relatively insignificant quantities of the vitamin activity are present in the quantity of kidney tissue used.

The digestion mixture is thoroughly extracted with an acidified organic solvent, such as butyl alcohol which is acidified with mineral acid to a pH less than about 4, say pH 3. The acidified solvent substantially completely extracts the unconjugated vitamin from the digestion mixture. The butanol solution of the vitamin is concentrated by evaporation under reduced pressure and then cooled. The active fraction containing the vitamin precipitates from the cooled solution and is centrifuged or filtered off.

The solid vitamin product is taken up in a solvent such as hot methanol, and the part which fails to dissolve consists of inactive material and is discarded. The methanol solution containing the vitamin is cooled and excess barium hydroxide solution added. A mixture of barium salts containing all of the vitamin precipitates out and is separated by filtration. The barium salt mixture is treated with hot water and the insoluble fraction discarded. The cooled neutral aqueous filtrate containing the barium salt of the vitamin is then treated with a soluble zinc salt, such as zinc acetate, in order to precipitate the less soluble zinc salt of the vitamin. The zinc salt is removed by filtration and converted to the soluble ammonium salt by suspending the salt in water and treating the mixture with ammonium oxalate solution. The insoluble zinc oxalate which precipitates is removed by filtration and the filtrate made slightly acidic. The free vitamin which separates is filtered off and dried. The free vitamin acid, pteroyl glutamic acid, prepared in this manner is substantially pure. A slightly higher purity may be obtained by recrystallization of the vitamin from water or methanol or mixtures of the two solvents.

This pure vitamin acid, pteroyl glutamic acid, is identical with the acid product described and claimed in Patent No. 2,407,906, issued September 3, 1946.

I claim:

1. Process for the isolation of a compound having chick anti-anemia activity and substantially no growth effect on *Lactobacillus casei* which comprises adsorbing said activity on charcoal from an acidified aqueous extract containing the chick anti-anemia activity, eluting the activity with aqueous alcoholic ammonia, concentrating the eluate and extracting the concentrate exhaustively with a lower aliphatic alcohol having a slight miscibility with water, evaporating the aqueous phase containing the desired activity to dryness, taking the residue up in water, adding the resultant solution to a lower alkyl ketone acidified with mineral acid, filtering the mixture, adsorbing the activity from the filtrate on charcoal, eluting the activity with aqueous alcoholic ammonia, concentrating the eluate, extracting the concentrate with phenol, saturating the aqueous phase containing the chick anti-anemia activity with ammonium sulfate, extracting the solution with phenol, treating the phenol phase with ether and water, adjusting the pH of the aqueous phase which separates to about 7, precipitating the active principle from said aqueous phase as the zinc salt, suspending the zinc salt in an aqueous acid solution at about pH 2.5, filtering the mixture, extracting the filtrate with phenol, treating the phenol phase with ether and water, adjusting the pH of the resultant aqueous phase to about 7, concentrating the solution, precipitating the active principle from the concentrate as the zinc salt, treating the dry zinc salt with lower alkyl alcohol and a small amount of mineral acid, evaporating the mixture, adding water and separating the precipitated crystalline lower alkyl ester of the chick anti-anemia factor, hydrolyzing the lower alkyl ester with alkali and separating from the hydrolysate in substantially pure form the vitamin conjugate having chick antianemia vitamin activity and substantially no growth effect on *Lactobacillus casei*.

2. Process for the isolation of a compound having chick anti-anemia activity and substantially no growth effect on *Lactobacillus casei* which comprises adsorbing said activity on charcoal from an acidified aqueous extract containing the chick anti-anemia activity, eluting the activity with aqueous alcoholic ammonia, concentrating the eluate and extracting the concentrate exhaustively with a lower aliphatic alcohol having a slight miscibility with water, evaporating the aqueous phase containing the desired activity to dryness, taking the residue up in water, adding the resultant solution to a lower alkyl ketone acidified with mineral acid, filtering the mixture, treating the filtrate with one equivalent of dilute alkali, concentrating the eluate, extracting the concentrate with phenol, saturating the aqueous phase containing the chick anti-anemia activity with ammonium sulfate, extracting the solution with phenol, treating the phenol phase with ether and water, adjusting the pH of the aqueous phase which separates to about 7, precipitating the active principle from said aqueous phase as the zinc salt, suspending the zinc salt in an aqueous acid solution at about pH 2.5, filtering the mixture, extracting the filtrate with phenol, treating the phenol phase with ether and water, adjusting the pH of the resulting aqueous phase to about 7, concentrating the solution, precipitating the active principle from the concentrate as the zinc salt, treating the dry zinc salt with lower alkyl alcohol and a small amount of mineral acid, evaporating the mixture, adding water and separating the precipitated crystalline lower alkyl ester of the chick anti-anemia factor, hydrolyzing the lower alkyl ester with alkali and separating from the hydrolysate in substantially pure form the vitamin conjugate having chick anti-anemia vitamin activity and substantially no growth effect on *Lactobacillus casei*.

3. In a process for obtaining an organic carboxylic acid vitamin conjugate, effective against anemia of chicks suffering from deficiency of the anti-anemia vitamin and having substantially no growth effect on *Lactobacillus casei*, the steps comprising forming from an impure aqueous extract containing chick anti-anemia activity, a precipitate of the insoluble zinc salt of the carboxylic acid vitamin conjugate, treating the dry zinc salt with lower alkyl alcohol and small amount of mineral acid, evaporating the mixture, adding water and separating the precipitated crystalline lower alkyl ester of the chick anti-anemia factor, hydrolyzing the lower alkyl ester with alkali and separating from the hydrolysate in more highly purified form the vitamin conjugate having chick anti-anemia vitamin activity and substantially no growth effect on *Lactobacillus casei*.

4. Process for the isolation of a compound having chick anti-anemia activity and substantially no growth effect on *Lactobacillus casei* which comprises adsorbing said activity on charcoal from an acidified aqueous extract containing chick anti-anemia activity, eluting the activity with aqueous alcoholic ammonia, concentrating the eluate and extracting the concentrate exhaustively with a lower aliphatic alcohol having a slight miscibility with water, evaporating the aqueous phase containing the desired activity to dryness, taking the residue up in water, adding the resultant solution to a lower alkyl ketone acidified with mineral acid, filtering the mixture, adsorbing the activity from the filtrate on charcoal, eluting the activity with aqueous alcoholic ammonia, concentrating the eluate, extracting the concentrate with phenol, saturating the aqueous phase containing the chick anti-anemia activity with ammonium sulfate, extracting the solution with phenol, treating the phenol phase with ether and water, adjusting the pH of the aqueous phase which separates to about 7, precipitating the active principle from said aqueous phase as the zinc salt, suspending the zinc salt in an aqueous acid solution at about pH 2.5, filtering the mixture, extracting the filtrate with phenol, treating the phenol phase with ether and water, adjusting the pH of the resultant aqueous phase to about 7, concentrating the solution, converting the active principle in the concentrate to the water soluble barium salt with barium hydroxide, adding the solution of the barium salt to a water soluble lower alkyl alcohol, separating the precipitated barium salt therefrom, decomposing said barium salt with mineral acid, filtering the mixture, concentrating the filtrate and separating from the concentrate in substantially pure form the vitamin conjugate having chick anti-anemia vitamin activity and substantially no growth effect on *Lactobacillus casei*.

5. Process for the isolation of a compound having chick anti-anemia activity and substantially no growth effect on *Lactobacillus casei* which comprises adsorbing said activity on charcoal from an acidified aqueous extract containing the chick anti-anemia activity, eluting the activity with aqueous alcoholic ammonia, concentrating the eluate and extracting the concentrate exhaustively with a lower aliphatic alcohol having a slight miscibility with water, evaporating the aqueous phase containing the desired activity to dryness, taking the residue up in water, adding the resultant solution to a lower alkyl ketone acidified with mineral acid, filtering the mixture, treating the filtrate with one equivalent of dilute alkali, concentrating the eluate, extracting the concentrate with phenol, saturating the aqueous phase containing the chick anti-anemia activity with ammonium sulfate, extracting the solution with phenol, treating the phenol phase with ether and water, adjusting the pH of the aqueous phase which separates to about 7, precipitating the active principle from said aqueous phase as the zinc salt, suspending the zinc salt in an aqueous acid solution at about pH 2.5, filtering the mixture, extracting the filtrate with phenol, treating the phenol phase with ether and water, adjusting the pH of the resultant aqueous phase to about 7, concentrating the solution, converting the active principle in the concentrate to the water soluble barium salt with barium hydroxide, adding the solution of the barium salt to a water soluble lower alkyl alcohol, separating the precipitated barium salt therefrom, decomposing said barium salt with mineral acid, filtering the mixture, concentrating the filtrate and separating from the concentrate in substantially pure form the vitamin conjugate having chick anti-anemia vitamin activity and substantially no growth effect on *Lactobacillus casei*.

6. Process for the isolation of a compound having chick anti-anemia activity and substantially no growth effect on *Lactobacillus casei*, which comprises adding an aqueous extract containing the chick anti-anemia principle to a lower alkyl ketone acidified with mineral acid, filtering the mixture, adsorbing the activity from the filtrate on charcoal, eluting the activity with aqueous alcoholic ammonia, concentrating the eluate, extracting the concentrate with phenol, saturating the aqueous phase containing the chick anti-

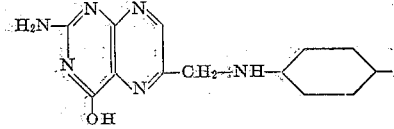

anemia activity with ammonium sulfate, extracting the solution with phenol, treating the phenol phase with ether and water, adjusting the pH

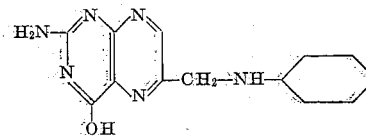

of the aqueous phase which separates to about 7, precipitating the active principle from said aqueous phase as the zinc salt, suspending the zinc salt in an aqueous acid solution at about pH 2.5, filtering the mixture, extracting the filtrate with phenol, treating the phenol phase with ether and water, adjusting the pH of the resultant aqueous phase to about 7, concentrating the solution, precipitating the active principle from the concentrate as the zinc salt, treating the dry zinc salt with lower alkyl alcohol and a small amount of mineral acid, evaporating the mixture, adding water and separating the precipitated crystalline lower alkyl ester of the chick anti-anemia factor, hydrolyzing the lower alkyl ester with alkali and separating from the hydrolysate in substantially pure form the vitamin conjugate having chick anti-anemia vitamin activity and substantially no growth effect on *Lactobacillus casei*.

7. In a process for obtaining an organic carboxylic acid vitamin conjugate, effective against anemia of chicks suffering from deficiency of the anti-anemia vitamin and having substantially no growth effect on *Lactobacillus casei*, the steps comprising forming from an impure aqueous extract containing chick anti-anemia activity, an aqueous solution of the crude barium salt of said conjugate, adding the solution of the barium salt to a water soluble lower alkyl alcohol, separating the precipitated barium salt therefrom, decomposing said barium salt with mineral acid, filtering the mixture, concentrating the filtrate and separating from the concentrate in more highly purified form the vitamin conjugate having chick anti-anemia vitamin activity and substantially no growth effect on *Lactobacillus casei*.

8. A pteroyl hepta glutamide compound having the formula,

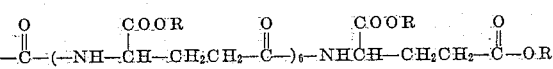

where R is lower alkyl.

9. An octamethyl pteroyl hepta glutamide compound having the formula,

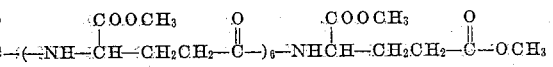

10. A compound of the class consisting of the esters and the salts of the esters of an organic carboxylic acid vitamin conjugate effective against anemia of chicks suffering from a deficiency of the anti-anemia vitamin and having substantially no growth effect on *Lactobacillus casei*, said esters being octa alkyl pteroyl glutamides, being yellow in color and crystallizing as microcrystalline birefrigent spherules, said esters being relatively insoluble in cold water, more soluble in hot water, soluble in methanol and ethanol, being dialyzable through cellophane 300, not precipitated by ammonium sulfate, giving negative reactions in the biuret test and trichloroacetic acid test for proteins and giving a negative Molisch test for carbohydrates.

JOSEPH J. PFIFFNER.

REFERENCES CITED

The following references are of record in the file of this patent:

UNITED STATES PATENTS

| Number | Name | Date |
|---|---|---|
| 1,990,961 | Stuart | Feb. 12, 1935 |

OTHER REFERENCES

Edgar et al.: Biochem. J., vol. 31, pp. 886-902 (1937).

Waller et al.: Ann. New York Acad. Sci., vol. 48, pp. 283-287 (1946).

Heinle et al.: Ann. New York Acad. Sci., vol. 48, pp. 343-346 (1946).

Welch et al.: Ann. New York Acad. Sci., vol. 48, pp. 347-349 (1946).